United States Patent
Greunke et al.

(10) Patent No.: US 11,819,968 B2
(45) Date of Patent: Nov. 21, 2023

(54) ROTARY POWER TOOL

(71) Applicant: MILWAUKEE ELECTRIC TOOL CORPORATION, Brookfield, WI (US)

(72) Inventors: Kyle Greunke, Auborndale, WI (US); Andrew D. Van Hoorn, Menomonee Falls, WI (US); Kevin A. McLachlan, Brookfield, WI (US); Julia C. Marsh, Milwaukee, WI (US); Mauricio Builes Zapata, Wauwatosa, WI (US); Daryl S. Richards, Sussex, WI (US); Beth E. Cholst, Wauwatosa, WI (US); Jeffery D. Spraggon, Oak Creek, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/579,140

(22) Filed: Jan. 19, 2022

(65) Prior Publication Data
US 2022/0226951 A1    Jul. 21, 2022

Related U.S. Application Data

(60) Provisional application No. 63/138,852, filed on Jan. 19, 2021.

(51) Int. Cl.
*B23Q 11/00* (2006.01)
*B25D 17/04* (2006.01)
(Continued)

(52) U.S. Cl.
CPC ...... *B23Q 11/0046* (2013.01); *B23Q 11/0071* (2013.01); *B25D 17/043* (2013.01);
(Continued)

(58) Field of Classification Search
CPC .................................................. B25F 1/006
See application file for complete search history.

(56) References Cited

U.S. PATENT DOCUMENTS

| 4,462,467 A | 7/1984 | Weingartner |
| 4,732,218 A | 3/1988 | Neumaier et al. |

(Continued)

FOREIGN PATENT DOCUMENTS

| CN | 107322536 A | 11/2017 |
| CN | 107486821 A | 12/2017 |

(Continued)

OTHER PUBLICATIONS

International Search Report and Written Opinion for Application No. PCT/US2022/012950 dated May 6, 2022 (11 pages).

*Primary Examiner* — Daniel Jeremy Leeds
(74) *Attorney, Agent, or Firm* — Michael Best & Friedrich LLP

(57) ABSTRACT

A rotary hammer includes a housing, a first motor supported by the housing and defining a first motor axis, a second motor supported by the housing and defining a second motor axis that is coaxial with the first motor axis, and a spindle coupled to the first motor for receiving torque from the first motor, causing the spindle to rotate. The rotary hammer further includes a reciprocation mechanism operable to create a variable pressure air spring within the spindle. The reciprocation mechanism includes a piston configured to reciprocate within the spindle in response to receiving torque from the second motor, a striker that is selectively reciprocable within the spindle in response to reciprocation of the piston, and an anvil that is impacted by the striker when the striker reciprocates towards the tool bit. The anvil imparts axial impacts to the tool bit.

10 Claims, 6 Drawing Sheets

(51) Int. Cl.
  *B25D 17/20* (2006.01)
  *B25F 5/02* (2006.01)
  *B28D 7/02* (2006.01)
  *B25F 5/00* (2006.01)

(52) U.S. Cl.
  CPC .............. *B25D 17/20* (2013.01); *B25F 5/003* (2013.01); *B25F 5/026* (2013.01); *B28D 7/02* (2013.01); *B25D 2211/061* (2013.01); *B25D 2217/0057* (2013.01); *B25D 2250/121* (2013.01)

(56) References Cited

U.S. PATENT DOCUMENTS

| | | | |
|---|---|---|---|
| 5,029,655 A | 7/1991 | Ebeling | |
| 5,415,240 A | 5/1995 | Mundjar | |
| 5,588,344 A | 12/1996 | Chun | |
| 6,854,529 B2 | 2/2005 | Kuntze et al. | |
| 7,182,150 B2 | 2/2007 | Grossman | |
| 7,204,321 B2 | 4/2007 | Agehara et al. | |
| 7,204,322 B2 | 4/2007 | Sakai | |
| 7,308,949 B2 | 12/2007 | Agehara et al. | |
| 7,354,226 B2 | 4/2008 | Britz | |
| 7,357,073 B2 | 4/2008 | Aoshima | |
| 7,360,391 B2 | 4/2008 | Iwashita et al. | |
| 7,434,505 B2 | 10/2008 | Suzuki et al. | |
| 7,574,891 B2 | 8/2009 | Futamura et al. | |
| 7,905,126 B2 | 3/2011 | Suzuki | |
| 7,918,120 B2 | 4/2011 | Suzuki | |
| 8,042,375 B2 | 10/2011 | Suzuki | |
| 8,240,534 B2 | 8/2012 | Hirabayashi | |
| 8,302,452 B2 | 11/2012 | Golorans et al. | |
| 8,423,159 B2 | 4/2013 | Bosga | |
| 8,534,376 B2 | 9/2013 | Braun et al. | |
| 8,708,619 B2 | 4/2014 | Rozycki et al. | |
| 8,979,441 B2 | 3/2015 | Rozycki et al. | |
| 9,630,307 B2 | 4/2017 | Ludy et al. | |
| 2006/0117542 A1 | 6/2006 | Katsibardis et al. | |
| 2008/0110009 A1 | 5/2008 | Katsibardis et al. | |
| 2008/0260485 A1 | 10/2008 | Jaillon et al. | |
| 2012/0193113 A1 | 8/2012 | Ho | |
| 2013/0255447 A1 | 10/2013 | Po | |
| 2018/0147681 A1 | 5/2018 | Le et al. | |
| 2021/0226488 A1* | 7/2021 | Pennington, III | ........ H02P 7/29 |

FOREIGN PATENT DOCUMENTS

| | | | |
|---|---|---|---|
| CN | 108161844 A | | 6/2018 |
| CN | 106335031 B | * | 6/2020 |
| DE | 2343661 A1 | | 3/1975 |
| DE | 4317002 A1 | | 11/1994 |
| EP | 1184762 B1 | | 6/2004 |
| EP | 1674207 A1 | | 6/2006 |
| GB | 2086777 B | | 1/1985 |
| JP | 2002160099 A | | 6/2002 |
| WO | 2004080703 A1 | | 9/2004 |

\* cited by examiner

ROTARY POWER TOOL

CROSS-REFERENCE TO RELATED APPLICATIONS

This application claims priority to U.S. Provisional Patent Application No. 63/138,852 filed on Jan. 19, 2021, the entire content of which is incorporated herein by reference.

FIELD OF THE INVENTION

The present invention relates to rotary power tools, and more particularly to rotary hammers.

BACKGROUND OF THE INVENTION

Rotary hammers can include impact mechanism having a reciprocating piston disposed within a spindle, a striker that is selectively reciprocable within the spindle in response to reciprocation of the piston, and an anvil that is impacted by the striker when the striker reciprocates toward the tool bit. Rotary hammers also transfer torque to the spindle, such that the spindle can rotate the tool bit as it reciprocates in response to reciprocation of the striker.

SUMMARY OF THE INVENTION

The present invention provides, in one aspect, a rotary hammer adapted to impart axial impacts to a tool bit. The rotary hammer includes a housing, a first motor supported by the housing and defining a first motor axis, a second motor supported by the housing and defining a second motor axis that is coaxial with the first motor axis, and a spindle coupled to the first motor for receiving torque from the first motor, causing the spindle to rotate. The rotary hammer further includes a reciprocation mechanism operable to create a variable pressure air spring within the spindle. The reciprocation mechanism includes a piston configured to reciprocate within the spindle in response to receiving torque from the second motor, a striker that is selectively reciprocable within the spindle in response to reciprocation of the piston, and an anvil that is impacted by the striker when the striker reciprocates towards the tool bit. The anvil imparts axial impacts to the tool bit.

The present invention provides, in another aspect, a rotary hammer adapted to impart axial impacts to a tool bit. The rotary hammer includes a housing, a first motor supported by the housing and defining a first motor axis, a second motor supported by the housing, and a spindle coupled to the first motor for receiving torque from the first motor, causing the spindle to rotate. The spindle defines a rotational axis that is parallel with the first motor axis. The rotary hammer further includes a reciprocation mechanism operable to create a variable pressure air spring within the spindle. The reciprocation mechanism includes a piston configured to reciprocate within the spindle in response to receiving torque from the second motor, a striker that is selectively reciprocable within the spindle in response to reciprocation of the piston, and an anvil that is impacted by the striker when the striker reciprocates towards the tool bit. The anvil imparts axial impacts to the tool bit.

The present invention provides, in yet another aspect, a rotary hammer adapted to impart axial impacts to a tool bit. The rotary hammer includes a housing, a motor supported by the housing, and a spindle coupled to the motor for receiving torque from the motor, causing the spindle to rotate. The spindle has an adjustable rotation speed. The rotary hammer further comprises a reciprocation mechanism operable to create a variable pressure air spring within the spindle. The reciprocation mechanism includes a piston configured to reciprocate within the spindle in response to receiving torque from the motor. The piston has an adjustable reciprocation frequency. The reciprocation mechanism also includes a striker that is selectively reciprocable within the spindle in response to reciprocation of the piston and an anvil that is impacted by the striker when the striker reciprocates towards the tool bit. The anvil imparts axial impacts to the tool bit. The rotary hammer further comprises a first transmission configured to transfer torque from the motor to the spindle and a second transmission configured to transfer torque from the motor to the reciprocation mechanism. The reciprocation frequency of the piston is adjustable independent of the rotation speed of the spindle. The rotation speed of the spindle is adjustable independent of the reciprocation frequency of the piston. At least one of the first and second transmissions is a multi-speed transmission.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
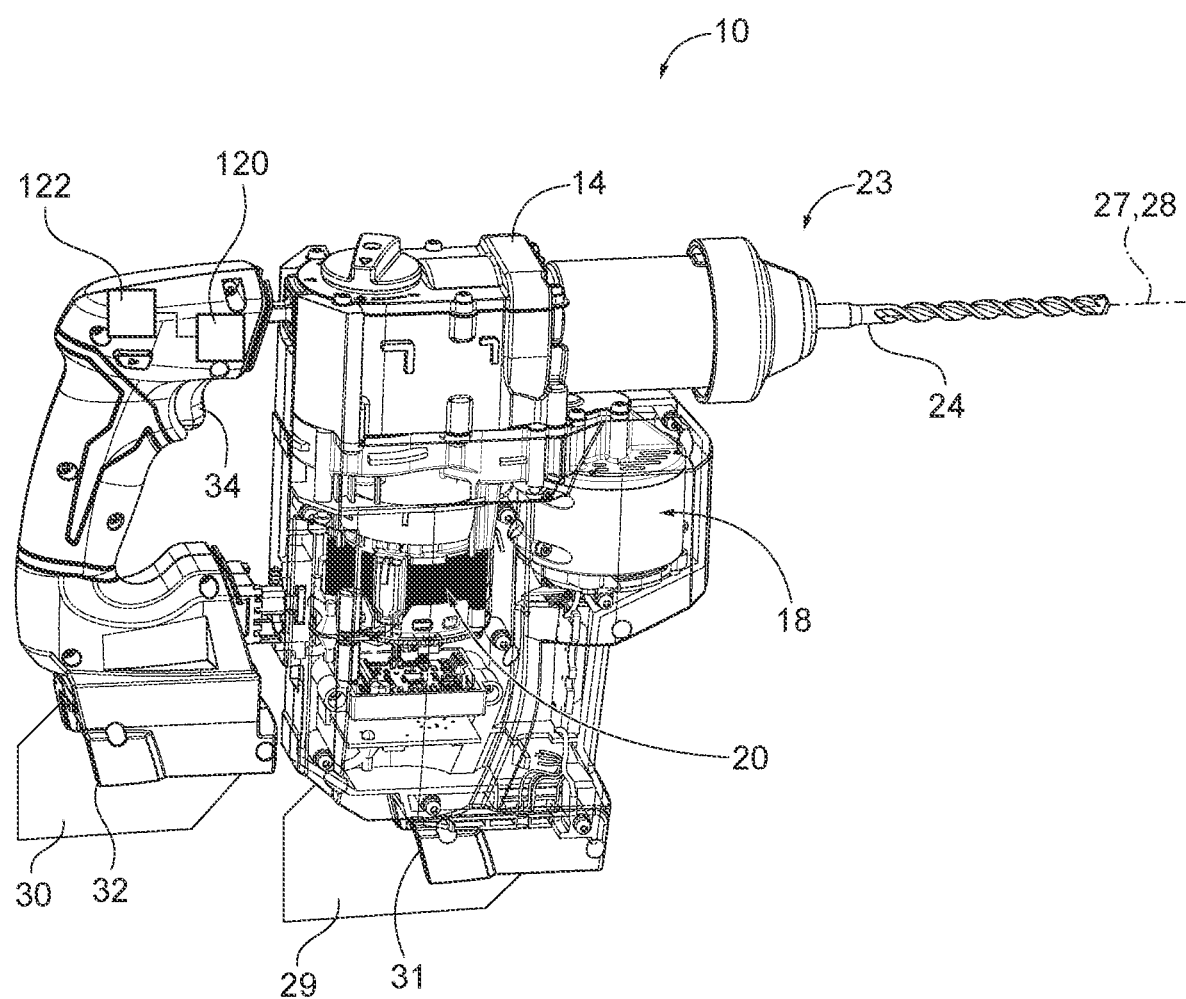
FIG. 1 is a perspective view of a rotary hammer according to an embodiment of the invention.
Figure 2:
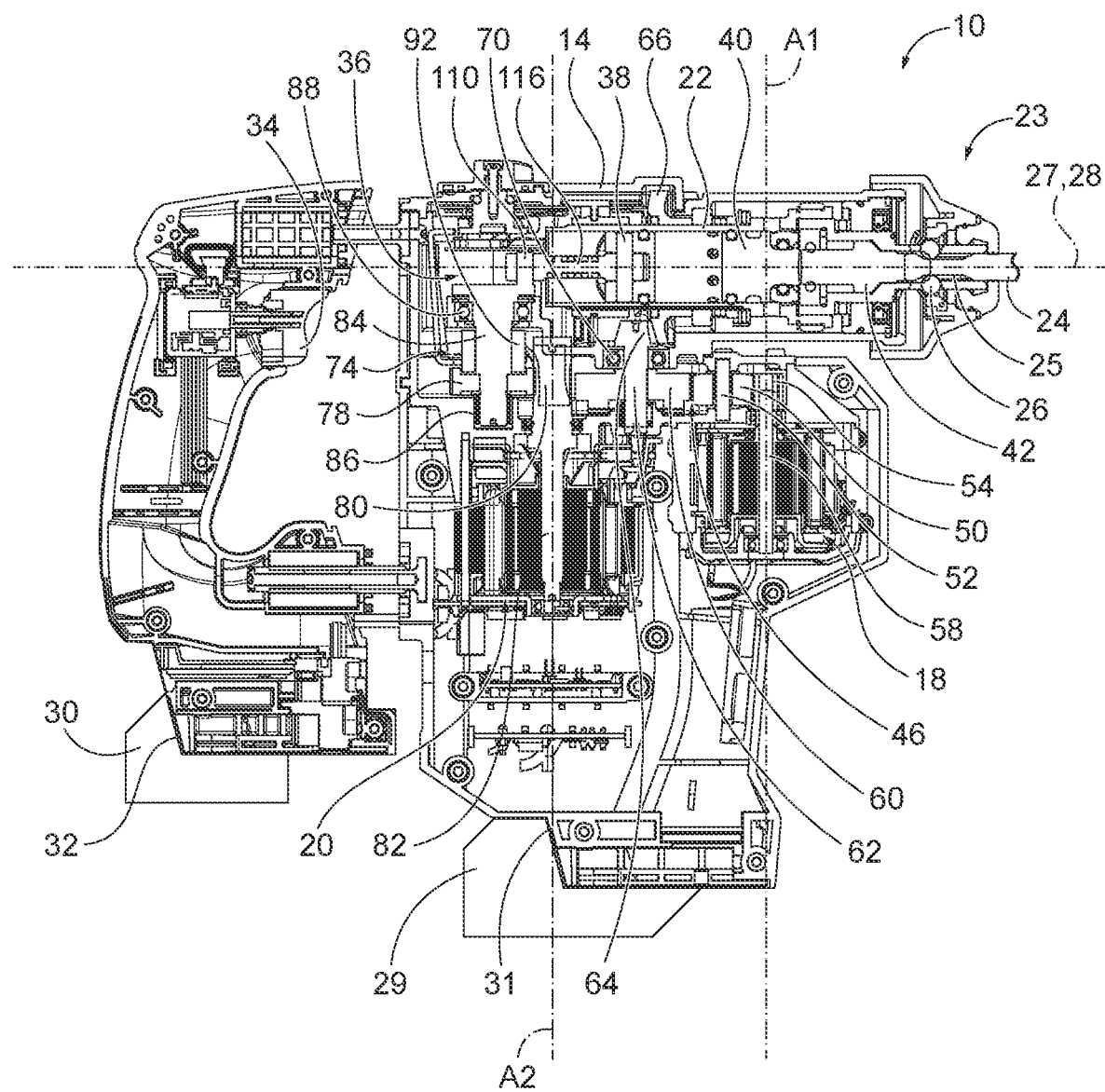
FIG. 2 is a cross-sectional view of the rotary hammer of FIG. 1.

FIGS. 1 and 2 illustrate a rotary power tool, such as rotary hammer 10, according to an embodiment of the invention. The rotary hammer 10 includes a housing 14, first and second motors 18, 20 disposed within the housing 14, and a rotatable spindle 22 coupled to the first motor 18 for receiving torque from the first motor 18. The first motor 18 defines a first motor axis A1 that is parallel with a second motor axis A2 that is defined by the second motor 20. In the illustrated embodiment, the rotary hammer 10 includes a quick-release chuck 23 coupled for co-rotation with the spindle 22 to facilitate quick removal and replacement of different tool bits. A tool bit 24 includes a necked section 25 or a groove in which a detent member 26 of the quick-release chuck 23 is received to constrain axial movement of the tool bit 24 to the length of the necked section 25 or groove. The rotary hammer 10 defines a tool bit axis 27, which in the illustrated embodiment is coaxial with a rotational axis 28 of the spindle 22.

The first and second motors 18, 20 are configured as DC motors that receive power from on-board power sources, such as first and second battery packs 29, 30 that are respectively selectively coupled to first and second receptacles 31, 32 on the housing 14. In some embodiments, only the first battery pack 29 is coupled to the first receptacle 31, and the first and second motors 18, 20 both receive power from the first battery pack 29. In other embodiments, only the second battery pack 30 is coupled to the second receptacle 32 and the first and second motors 18, 20 both receive power from the second battery pack 30. In other embodiments, the first and second battery packs 29, 30 are both respectively coupled to the first and second receptacles 31, 32, and the first motor 18 receives power from the first battery pack 29, and the second motor 20 receives power from the second battery pack 30.

The first and second battery packs 29, 30 may include any of a number of different nominal voltages (e.g., 12V, 18V, etc.), and may be configured having any of a number of different chemistries (e.g., lithium-ion, nickel-cadmium, etc.). Alternatively, the first and second motors 18, 20 may be powered by a remote power source (e.g., a household electrical outlet) through a power cord. The first and second motors 18, 20 are selectively activated, either simultaneously or separately as described in further detail below, by depressing an actuating member, such as a trigger 34.

The rotary hammer 10 further includes an impact mechanism 36 (FIG. 2) having a reciprocating piston 38 disposed within the spindle 22, a striker 40 that is selectively reciprocable within the spindle 22 in response to reciprocation of the piston 38, and an anvil 42 that is impacted by the striker 40 when the striker reciprocates toward the tool bit 24. Torque from the first motor 18 is transferred to the spindle 22 by a first transmission 46. In the illustrated embodiment of the rotary hammer 10, the first transmission 46 includes a first gear 50 rotatable on a stationary shaft 52 and engaged with a pinion 54 on an output shaft 58 that is selectively driven by the first motor 18. The first transmission 46 further includes a second gear 60 in meshing relationship with the first gear 50, and a drive shaft 62 coupled for rotation with the second gear 60 and having an drive pinion 64 engaged with and configured to drive an output gear 66 coupled for co-rotation with the spindle 22. The drive shaft 62 is rotatably supported within the housing 14 by a bearing 70 arranged between the second gear 60 and the drive pinion 64. The output gear 66 is secured to the spindle 22 using a spline-fit or a key and keyway arrangement, for example, that facilitates axial movement of the spindle 22 relative to the output gear 66 yet prevents relative rotation between the spindle 22 and the output gear 66.

The impact mechanism 36 is driven by a second transmission 74 that receives torque from the second motor 20. The second transmission 74 includes an input gear 78 that is engaged with a pinion 80 on an output shaft 82 that is selectively driven by the second motor 20. The impact mechanism 36 includes a crankshaft 84 that is coupled for co-rotation with the input gear 78 and is rotatably supported within the housing 14 by bearings 86, 88 and a bushing 92. The crankshaft 84 includes an eccentric pin 110 and the impact mechanism 36 further includes a connecting rod 116 interconnecting the piston 38 and the eccentric pin 110.

With reference to FIG. 1, the rotary hammer 10 includes a mode selection switch illustrated schematically at 120 in electrical communication with the first and second motors 18, 20, to allow an operator to switch between three modes.

Both of the first and second motors 18, 20 are activated by a controller 122 (also illustrated schematically) in response to the trigger 34 being depressed and the mode selection switch 120 being set to a "hammer-drill" mode, to simultaneously and respectively rotate the spindle 22 and reciprocate the piston 38. Only the first motor 18 is activated by the controller 122 in response to depression of the trigger 34 and the mode selection switch 120 being set to a "drill-only" mode, such that the spindle 22 is rotated by the motor 18 while second motor 20 is deactivated and the piston 38 is thus inactive. Only the second motor 20 is activated by the controller 12 in response to the trigger 34 being depressed and the mode selection switch 120 being set to a "hammer-only" mode, such that the piston 38 is reciprocated while the first motor 18 is deactivated, such that the spindle 22 does not rotate.

In operation, if "hammer-drill" mode is selected with the mode selection switch 120 and the trigger 34 is depressed, both of the first and second motors 18, 20 are activated. In response to activation of the first motor 18, rotation of the pinion 54 of the output shaft 58 causes the first gear 50 to rotate. Rotation of the first gear 50 causes the second gear 60 and thus the drive shaft 62 to rotate, such that the drive pinion 64 drives the output gear 66 on the spindle 22, causing the spindle 22 and the tool bit 24 to rotate. In response to activation of the second motor 20, the input gear 78 is rotated by the pinion 80, such that the crankshaft 84 and thus the eccentric pin 110 are rotated as well. Rotation of the eccentric pin 110 causes the piston 38 to reciprocate within the spindle 22 via the connecting rod 116, which causes the striker 40 to impart axial blows to the anvil 42, which in turn causes reciprocation of the tool bit 24 against a workpiece. Specifically, a variable pressure air pocket (or an air spring) is developed between the piston 38 and the striker 40 when the piston 38 reciprocates within the spindle 22, whereby expansion and contraction of the air pocket induces reciprocation of the striker 40. The impact between the striker 40 and the anvil 42 is then transferred to the tool bit 24, causing it to reciprocate for performing work on workpiece.

In operation, if "drill-only" mode is selected with the mode selection switch 120 and the trigger 34 is depressed, only the first motor 18 is activated by the mode selection switch 120, such that the spindle 22 is rotated by the motor 18 while second motor 20 is deactivated and the piston 38 is thus inactive. In operation, if "hammer-only" mode is selected with the mode selection switch 120 and the trigger 34 is depressed, only the second motor 20 is activated by the mode selection switch 120 in response to depression of the trigger 34, such that the piston 38 is reciprocated, while the first motor 18 is deactivated, such that the spindle 22 does not rotate.

Advantageously, by using first and second motors 18, 20 to respectively and separately control rotation of the spindle 18 and reciprocation of the piston 38, the reciprocation frequency of the piston 38 may be controlled independently of the rotational speed of the spindle 22. In other words, the rotational speed of the spindle 22 may be kept constant by keeping the speed of the first motor 18 constant, while the reciprocation frequency of the piston 38 may be increased or decreased by increasing or decreasing the speed of the second motor 20. By adjusting the reciprocation frequency of the piston 38, the blow pattern of the tool bit 24 may conveniently be adjusted independent of the rotational speed of the spindle 22, before or during the operation, depending on a size, cutter, or geometry of the tool bit 24. Thus, a ratio of the rotational speed of the spindle 18 to the reciprocation frequency of the piston 38 can be optimized to allow the tool bit 24 to drill at an optimal, maximum speed for a certain operation type.

Figure 3:
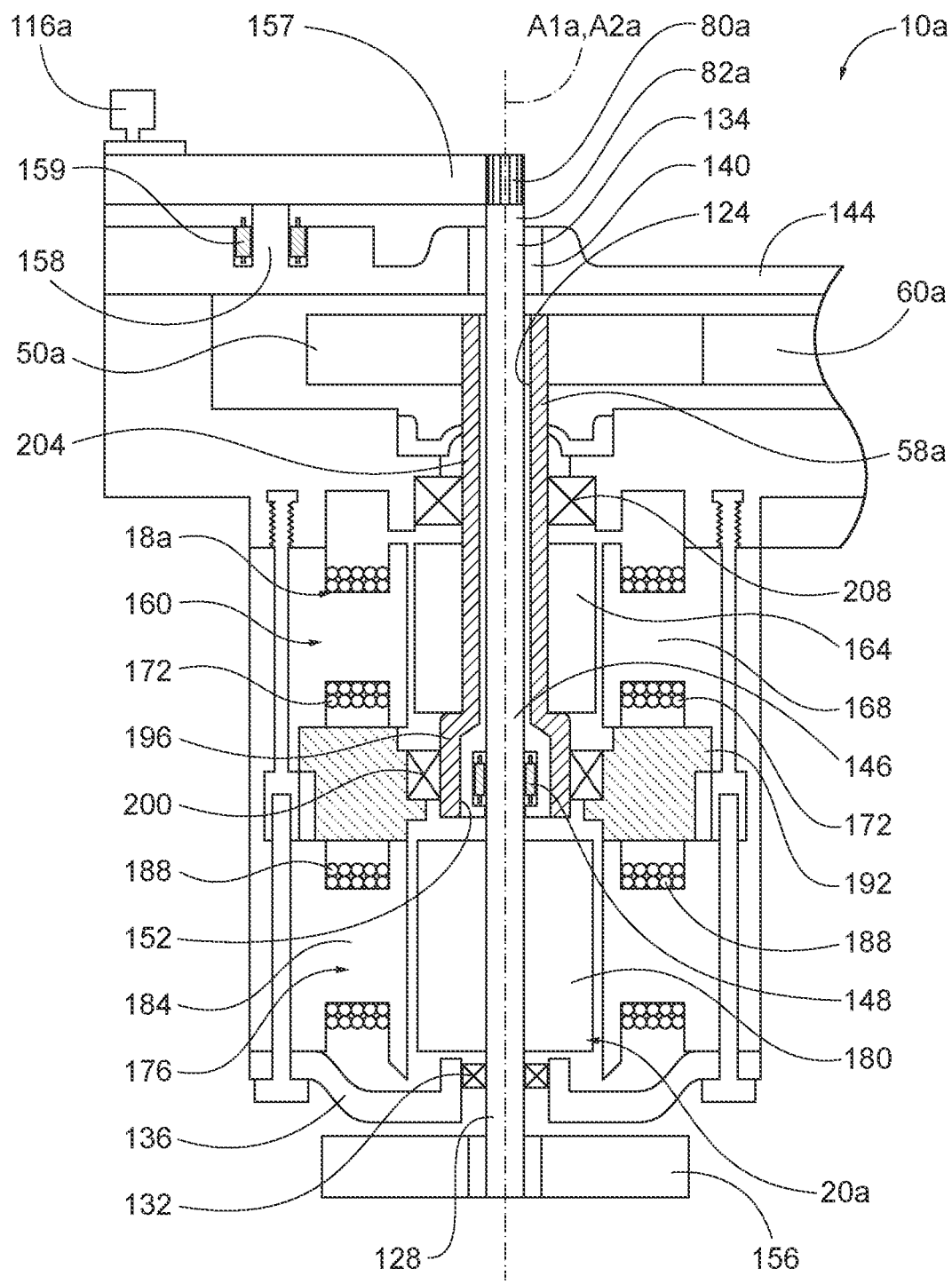
FIG. 3 is an enlarged, cross-sectional view of a rotary hammer according to another embodiment of the invention.

FIG. 3 illustrates a rotary hammer 10a according to another embodiment of the invention. The rotary hammer 10a is identical to the rotary hammer 10, with like parts having the same annotation plus the letter "a", and the following differences explained below. In the rotary hammer 10a, the first motor axis A1a is coaxial with the second motor axis A2a, and the output shaft 82a of the second motor 20a extends through a bore 124 in the output shaft 58a of the first motor 18a. A first end 128 of the output shaft 82a of the second motor 20a is rotatably supported by a first bearing 132 arranged within a heat sink 136. An opposite, second end 134 of the output shaft 82a of the second motor 20a is rotatably supported by a second bearing 140 arranged within a gearcase 144. An intermediate portion 146 of the output shaft 82a of the second motor 20a is rotatably supported within the output shaft 58a of the first motor 18a by a bearing 148 set in a bearing pocket 152 of the output shaft 58a. A first fan 156 is coupled for rotation with the first end 128 of the output shaft 82a to axially draw a cooling airflow through the first and second motors 18a, 20a during operation. Instead of being engaged with an input gear, the pinion 80a of the output shaft 82a of the second motor 20a is engaged with a driven gear 157 having the eccentric pin 116a, such that in response to rotation of the output shaft 82a of the second motor 20a, the driven gear 157 is rotated by the pinion 80a. The driven gear 157 includes a stem 158 that is rotatably supported within the gearcase 144 by a bearing 159 set in the gearcase 144. Instead of being arranged on a stationary shaft, the first gear 50a is arranged on the first output shaft 58a.

The first motor 18a includes a first stator 160 and a first rotor 164 to which the output shaft 58a of the first motor 18a is coupled for rotation. The first stator 160 includes a first stator core 168 around which a plurality of first windings 172 are wrapped. In response to activation of the first motor 18a, electrical current passes through the first windings 172, thus generating a first electromagnetic field that causes rotation of the first rotor 164. The second motor 20a includes a second stator 176 and a second rotor 180 to which the output shaft 82a of the second motor 20a is coupled for rotation. The second stator 176 includes a second stator core 184 around which a plurality of second windings 188 are wrapped. In response to activation of the second motor 20a, electrical current passes through the second windings 188, thus generating a second electromagnetic field that causes rotation of the second rotor 180. By arranging the first and second motors 18a, 20a to have coaxial axes A1a, A2a, and by arranging the output shaft 82a of the second motor 20a within the output shaft 58a of the first motor 18a, the design envelope for the rotary hammer 10a is advantageously reduced, thus making the rotary hammer 10a easier to use and store.

In the embodiment illustrated in FIG. 3, the first and second stators 160, 176 are separated by an intermediate member 192 that includes electromagnetic shielding (e.g., a brass ring) to inhibit the first electromagnetic field generated by the first windings 172 from affecting rotation of the second rotor 180, and to inhibit the second electromagnetic field generated by the second windings 188 from affecting rotation of the first rotor 164. Thus, in "hammer-drill" mode, when both of the first and second motors 18a, 20a are simultaneously activated, activation of the first motor 18a does not affect or interfere with operation of the impact mechanism 36a (not shown in FIG. 3), and activation of the second motor 20a does not affect or interfere with rotation of the spindle 22a (not shown in FIG. 3). In other embodiments, the first and second stator cores 168, 184 may be formed together, but electromagnetic shielding is still arranged between the first windings 172 and second windings 188.

A first portion 196 of the output shaft 82a of the second motor 20a is rotatably supported by a bearing 200 arranged in the intermediate member 192. An opposite second portion 204 of the output shaft 82a of the second motor 20a, is rotatably supported by a bearing 208 arranged in the gearcase 144. In some embodiments, a second fan is arranged on the output shaft 82a of the second motor 20a between the second rotor 180 and the bearing 208.

In other embodiments, the first rotor 164 is arranged on top of the second rotor 180 via bearing elements and the second rotor 180 uses the first rotor 164 as a mount. In such an embodiment, the first and second stators 160, 176 are formed as a single staged stator with separate first and second windings 172, 188.

Figure 4:
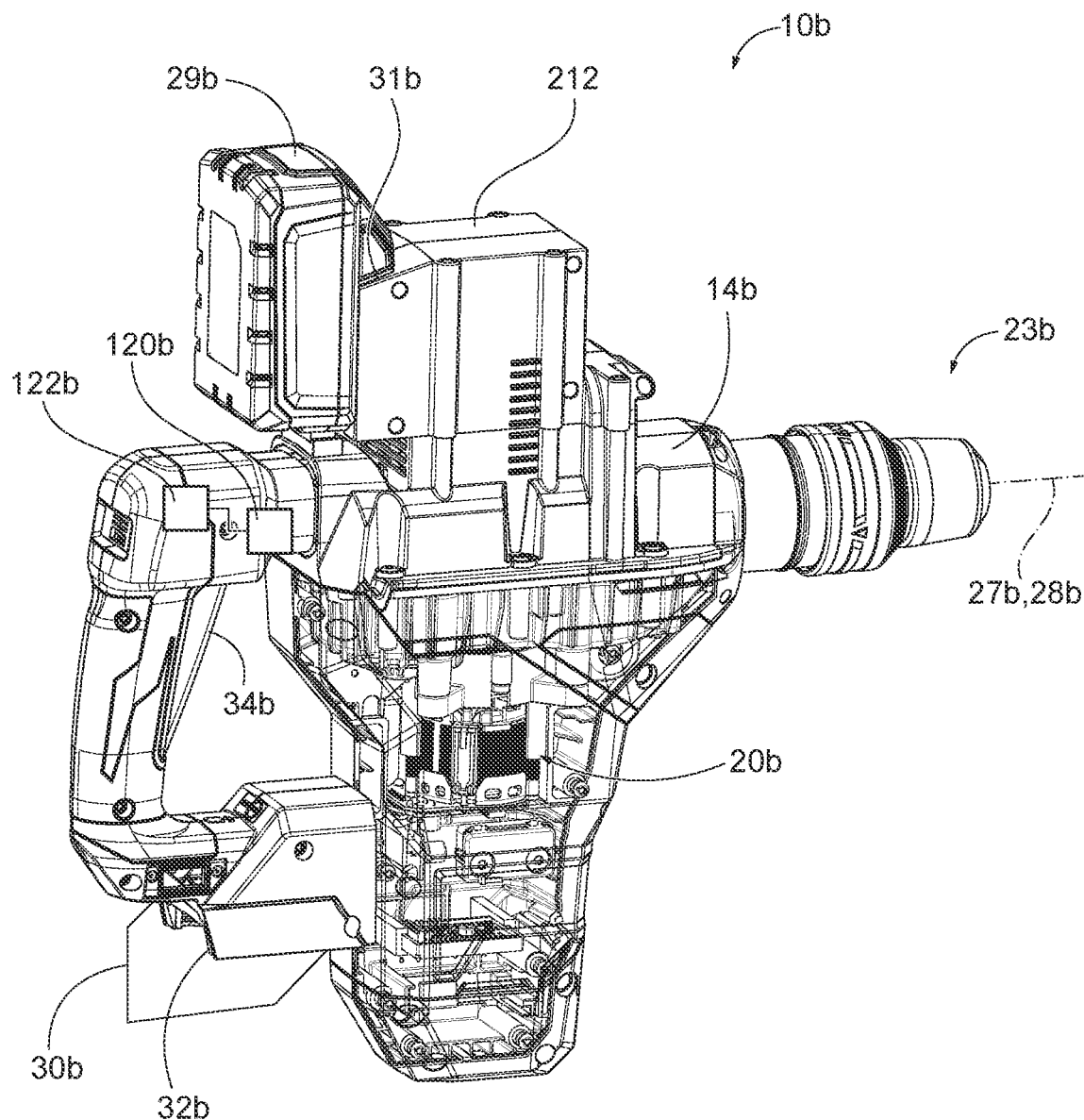
FIG. 4 is a perspective view of a rotary hammer according to another embodiment of the invention.
Figure 5:
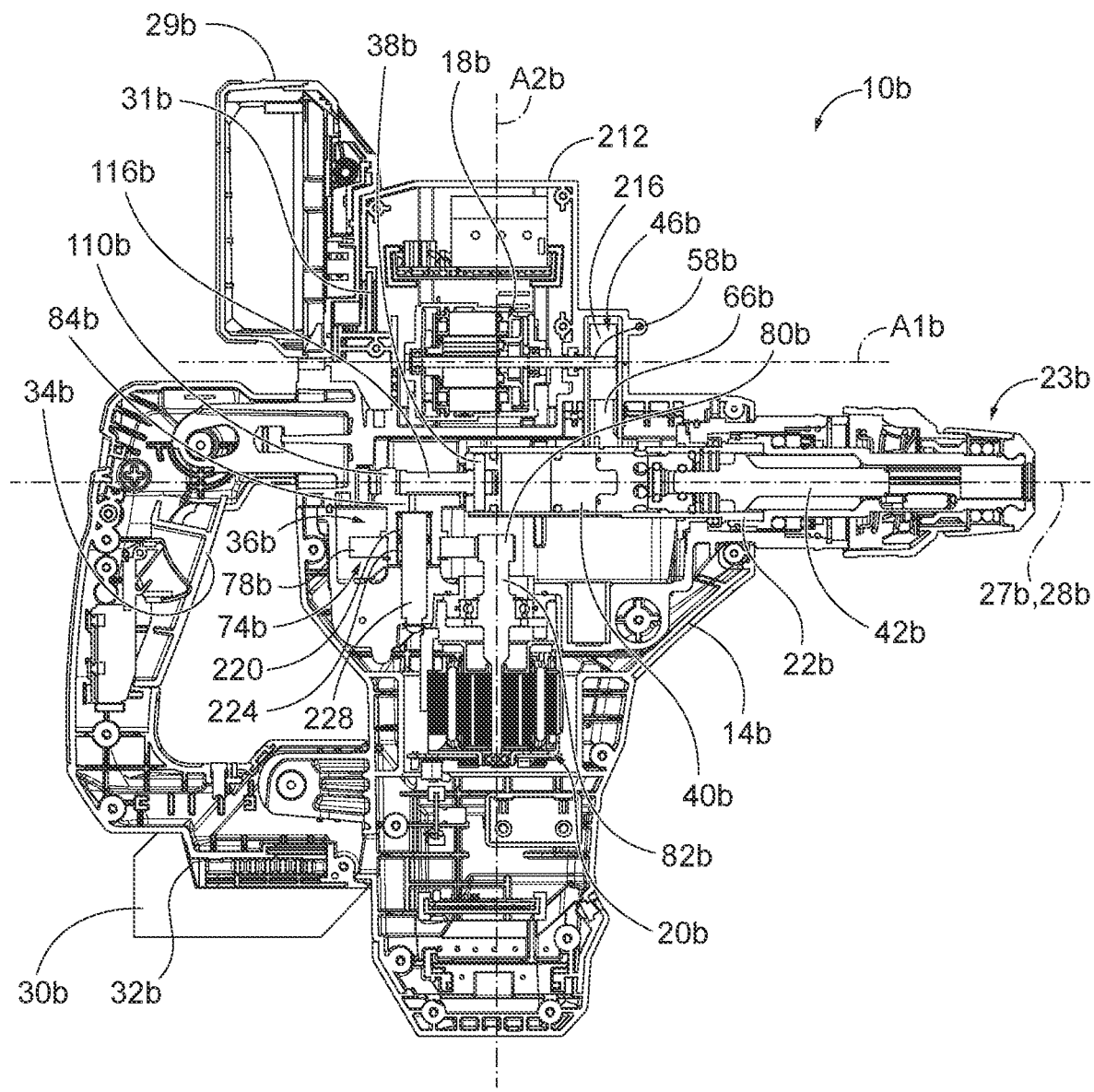
FIG. 5 is a cross-sectional view of the rotary hammer of FIG. 4.

FIGS. 4 and 5 illustrate a rotary hammer 10b according to another embodiment of the invention. The rotary hammer 10b is identical to the rotary hammer 10, with like parts having the same annotation plus the letter "b", and the following differences explained below. The housing 14b includes an upper housing portion 212 in which the first motor 18b is arranged and on which the first receptacle 31b is arranged. The first motor axis A1b is parallel with the rotational axis 28b of the spindle 22b. And, a drive gear 216 on the output shaft 58b of the first motor 18b is engaged with the output gear 66b. The crankshaft 84b is rotatably supported within the housing 14b by a pair of bearings 220, 224 set on a stationary post 228. Advantageously, instead of having to use spiral bevel gears 64, 66 as in the rotary hammer 10, in the rotary hammer 10b, drive gear 216 is a spur gear and output gear 66b is a spur gear, thus reducing cost. Also, by positioning the first motor 18b on the opposite side of the rotational axis 28b of the spindle 22b as the second motor 20b, the length of the rotary hammer 10b (measured along the axis 28b) is reduced compared to the rotary hammer 10.

Figure 6:
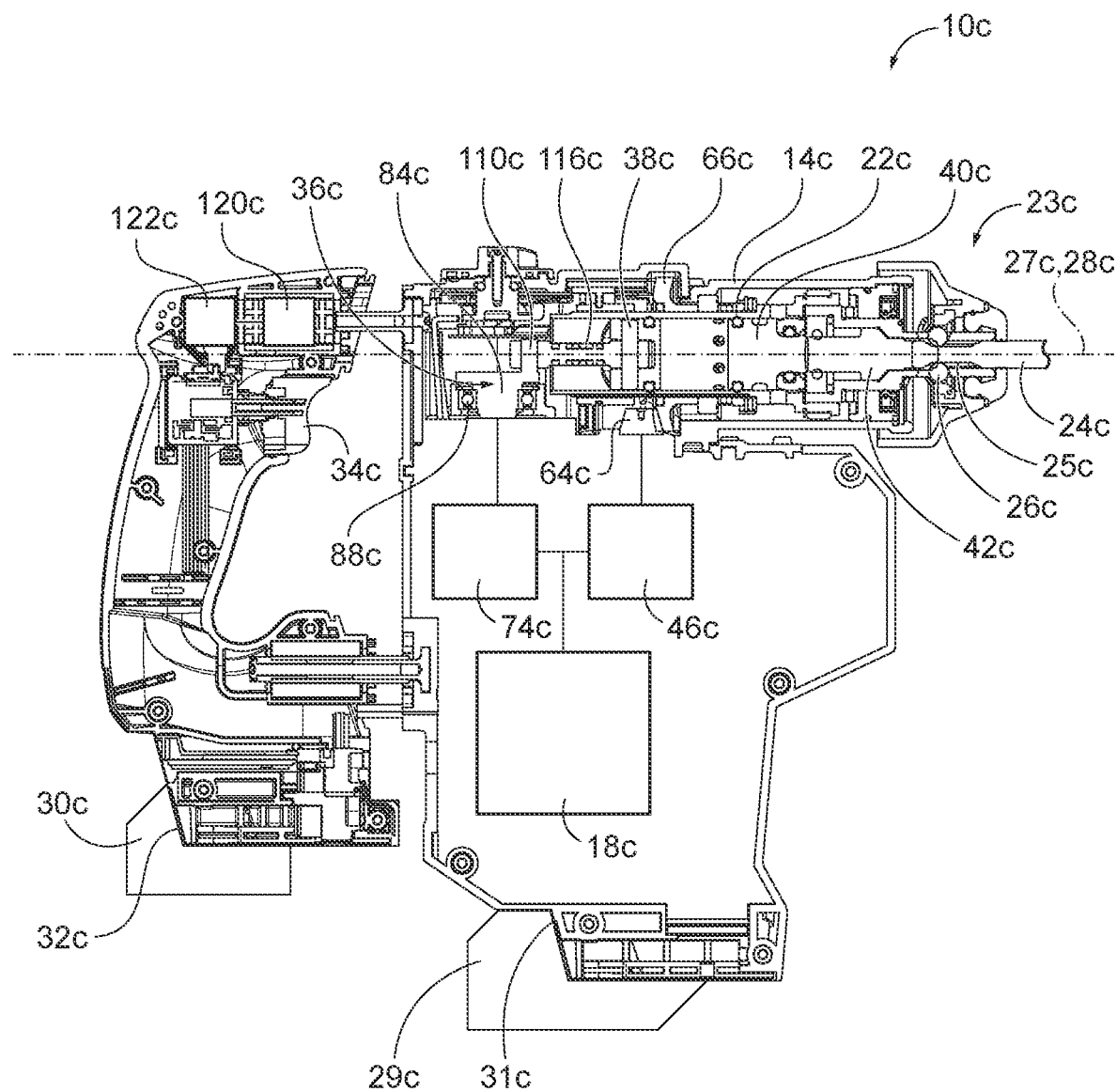
FIG. 6 is a cross-sectional view of a rotary hammer according to another embodiment of the invention.

FIG. 6 illustrates a rotary hammer 10c according to another embodiment of the invention. The rotary hammer 10c is identical to the rotary hammer 10, with like parts having the same annotation plus the letter "c", and the following differences explained below. The rotary hammer 10c does not have a second motor or second receptacle for a second battery. Rather, in rotary hammer 10c, the schematically illustrated first motor 18c provides torque to each of the schematically illustrated first and second transmissions 46c, 74c. And, the first and transmissions 46c, 74c are both multi-speed transmissions, such as a continuously variable transmission ("CVT") or an intelligent variable transmission ("IVT"). A CVT is an automatic transmission that can change seamlessly through a continuous range of gear ratios, in contrast with other transmissions that provide a limited number of gear ratios in fixed steps. Similar to a CVT, an IVT performs continuous shifts, correlating to a broader ratio of operation than many other, similar transmissions. Thus, just as in the previous embodiments of the rotary hammers 10, 10a, and 10b, in the rotary hammer 10c, the first and second transmissions 46c, 74c are used to respectively and separately control the rotational speed of the spindle 18c and the frequency of reciprocation of the piston 38c.

Although the invention has been described in detail with reference to certain preferred embodiments, variations and modifications exist within the scope and spirit of one or more independent aspects of the invention as described.

Various features of the invention are set forth in the following claims.

What is claimed is:

1. A rotary hammer adapted to impart axial impacts to a tool bit, the rotary hammer comprising:
a housing;
a first motor supported by the housing and defining a first motor axis;
a second motor supported by the housing and defining a second motor axis that is coaxial with the first motor axis;
a spindle coupled to the first motor for receiving torque from the first motor, causing the spindle to rotate;
a reciprocation mechanism operable to create a variable pressure air spring within the spindle, the reciprocation mechanism including
a piston configured to reciprocate within the spindle in response to receiving torque from the second motor,
a striker that is selectively reciprocable within the spindle in response to reciprocation of the piston, and
an anvil that is impacted by the striker when the striker reciprocates towards the tool bit, the anvil imparting axial impacts to the tool bit,
wherein the first motor includes a first motor output shaft, wherein the second motor includes a second motor output shaft, and wherein the second motor output shaft extends through a bore in the first motor output shaft.

2. The rotary hammer of claim 1, further comprising a bearing disposed within the first motor output shaft, and wherein the second motor output shaft is rotatably supported relative to the first motor output shaft by the bearing.

3. The rotary hammer of claim 1, further comprising electromagnetic shielding disposed between the first motor and the second motor.

4. The rotary hammer of claim 3, wherein the first motor includes a first stator core having first windings, wherein the second motor includes a second stator core having second windings, and wherein the electromagnetic shielding is disposed between the first windings and the second windings.

5. The rotary hammer of claim 3, wherein the first motor includes a first stator core, wherein the second motor includes a second stator core, and wherein the first stator core and the second stator core are formed together as a single staged stator.

6. The rotary hammer of claim 5, wherein the single staged stator includes first windings corresponding to the first stator core and second windings corresponding to the second stator core.

7. A rotary hammer adapted to impart axial impacts to a tool bit, the rotary hammer comprising:
a housing;
a first motor supported by the housing and defining a first motor axis;
a second motor supported by the housing and defining a second motor axis that is coaxial with the first motor axis;
electromagnetic shielding disposed between the first motor and the second motor
a spindle coupled to the first motor for receiving torque from the first motor, causing the spindle to rotate;
a reciprocation mechanism operable to create a variable pressure air spring within the spindle, the reciprocation mechanism including
a piston configured to reciprocate within the spindle in response to receiving torque from the second motor,
a striker that is selectively reciprocable within the spindle in response to reciprocation of the piston, and
an anvil that is impacted by the striker when the striker reciprocates towards the tool bit, the anvil imparting axial impacts to the tool bit,
wherein the first motor includes a first stator core having first windings, wherein the second motor includes a second stator core having second windings, and wherein the electromagnetic shielding is disposed between the first windings and the second windings.

8. A rotary hammer adapted to impart axial impacts to a tool bit, the rotary hammer comprising:
a housing;
a first motor supported by the housing and defining a first motor axis;
a second motor supported by the housing and defining a second motor axis that is coaxial with the first motor axis;
electromagnetic shielding disposed between the first motor and the second motor;
a spindle coupled to the first motor for receiving torque from the first motor, causing the spindle to rotate;
a reciprocation mechanism operable to create a variable pressure air spring within the spindle, the reciprocation mechanism including
a piston configured to reciprocate within the spindle in response to receiving torque from the second motor,
a striker that is selectively reciprocable within the spindle in response to reciprocation of the piston, and
an anvil that is impacted by the striker when the striker reciprocates towards the tool bit, the anvil imparting axial impacts to the tool bit,
wherein the first motor includes a first stator core, wherein the second motor includes a second stator core, and wherein the first stator core and the second stator core are formed together as a single staged stator.

9. The rotary hammer of claim 8, wherein the single staged stator includes first windings corresponding to the first stator core and second windings corresponding to the second stator core.

10. The rotary hammer of claim 9, wherein the electromagnetic shielding is disposed between the first windings and the second windings.

* * * * *